United States Patent

Burnett

[15] 3,661,230

[45] May 9, 1972

[54] DISC BRAKE WITH ACTUATING MEANS AND MANUALLY RELEASABLE ADJUSTING MEANS

[72] Inventor: Richard T. Burnett, South Bend, Ind.

[73] Assignee: The Bendix Corporation

[22] Filed: May 18, 1970

[21] Appl. No.: 38,459

[52] U.S. Cl..........................188/71.9, 188/72.3, 188/72.6, 188/106 F, 188/196 D, 188/170
[51] Int. Cl........................................................F16d 65/56
[58] Field of Search....................188/71.9, 72.3, 170, 196 D, 188/106 F, 166, 167, 72.6

[56] References Cited

UNITED STATES PATENTS

| | | | |
|---|---|---|---|
| 3,033,325 | 5/1962 | Tjernstrom | 188/170 |
| 3,401,775 | 9/1968 | Sobol et al. | 188/196 D |
| 3,442,357 | 5/1969 | Farr | 188/71.9 |

Primary Examiner—George E. A. Halvosa
Attorney—William N. Antonis and Plante, Hartz, Smith and Thompson

[57] ABSTRACT

A disc brake is disclosed which has a spring actuator in addition to the usual hydraulic actuator. When the brake is functioning normally, fluid pressure opposes the spring actuator to permit normal hydraulic operation of the brake. However, when a malfunction in the vehicle's hydraulic system prevents operation of the hydraulic actuator, the spring actuator automatically applies the brake to immobilize the vehicle. A mechanical release mechanism for the spring actuator is provided so that the vehicle may be moved if the spring actuator applies the brake in an inconvenient location. The spring actuator may also be used as a parking brake.

9 Claims, 2 Drawing Figures

INVENTOR.
RICHARD T. BURNETT
BY
Plante, Hartz, Smith
& Thompson
ATTORNEYS

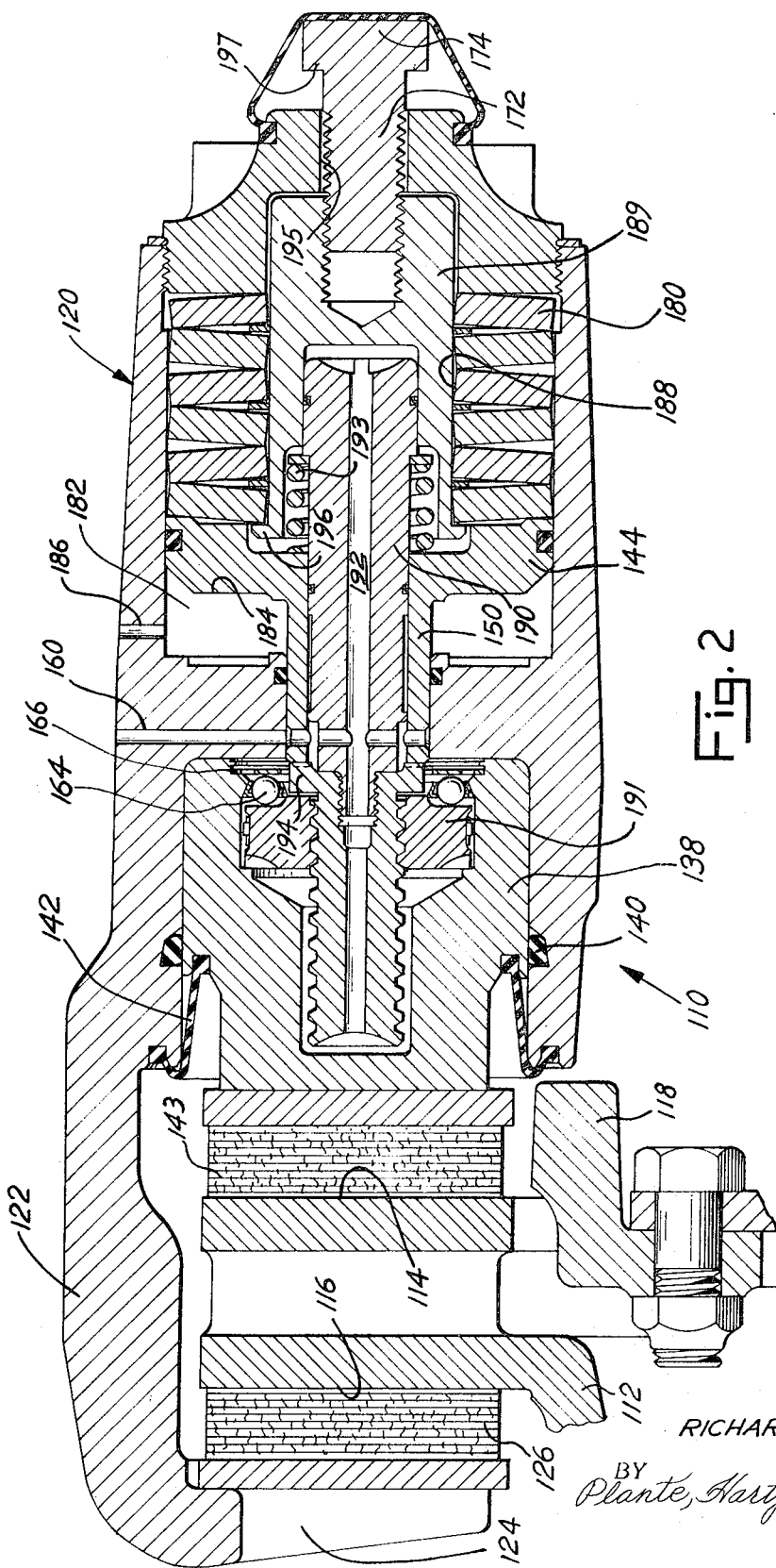

DISC BRAKE WITH ACTUATING MEANS AND MANUALLY RELEASABLE ADJUSTING MEANS

BACKGROUND OF THE INVENTION

This invention relates to a disc brake having a spring actuator in addition to the normal hydraulic actuator.

In order to provide "fail safe" braking for vehicles equipped with disc brakes, it is necessary to provide a mechanical brake actuator in addition to the usual hydraulic actuator that automatically applies the vehicle's brakes when a malfunction in the vehicle hydraulic system prevents normal operation of the hydraulic actuator. Such a brake, which incorporates a spring actuator within the caliper housing which is opposed by hydraulic pressure when the hydraulic system is functioning normally, is disclosed in U.S. Pat. application Ser. No. 797,530 now U.S. Pat. No. 3,599,761, filed Feb. 7, 1969, owned by the assignee of the present invention, and incorporated herein by reference. However, a problem inherent in such a fail-safe braking system is that the vehicle hydraulic system might fail while the vehicle is standing in an inconvenient location. It is therefore, desirable to provide a way to release the spring actuator so that the vehicle may be towed to a place where repair may more conveniently be made.

SUMMARY OF THE INVENTION

Therefore, an important object of my invention is to provide a mechanism for releasing the braking force applied by the spring actuator in a disc brake after a malfunction has rendered the vehicle hydraulic system inoperable.

Another important object of my invention is to provide a release mechanism that requires a minimum operator-applied force to release the spring actuator.

A further important object of my invention is to provide a novel automatic adjuster for disc brakes that limits retraction of the piston to a substantially constant distance independently of wear of the friction elements.

DESCRIPTION OF THE DRAWINGS

FIG. 2 is a longitudinal cross-sectional view of an alternate embodiment of my disc brake.

DETAILED DESCRIPTION

Figure 1:
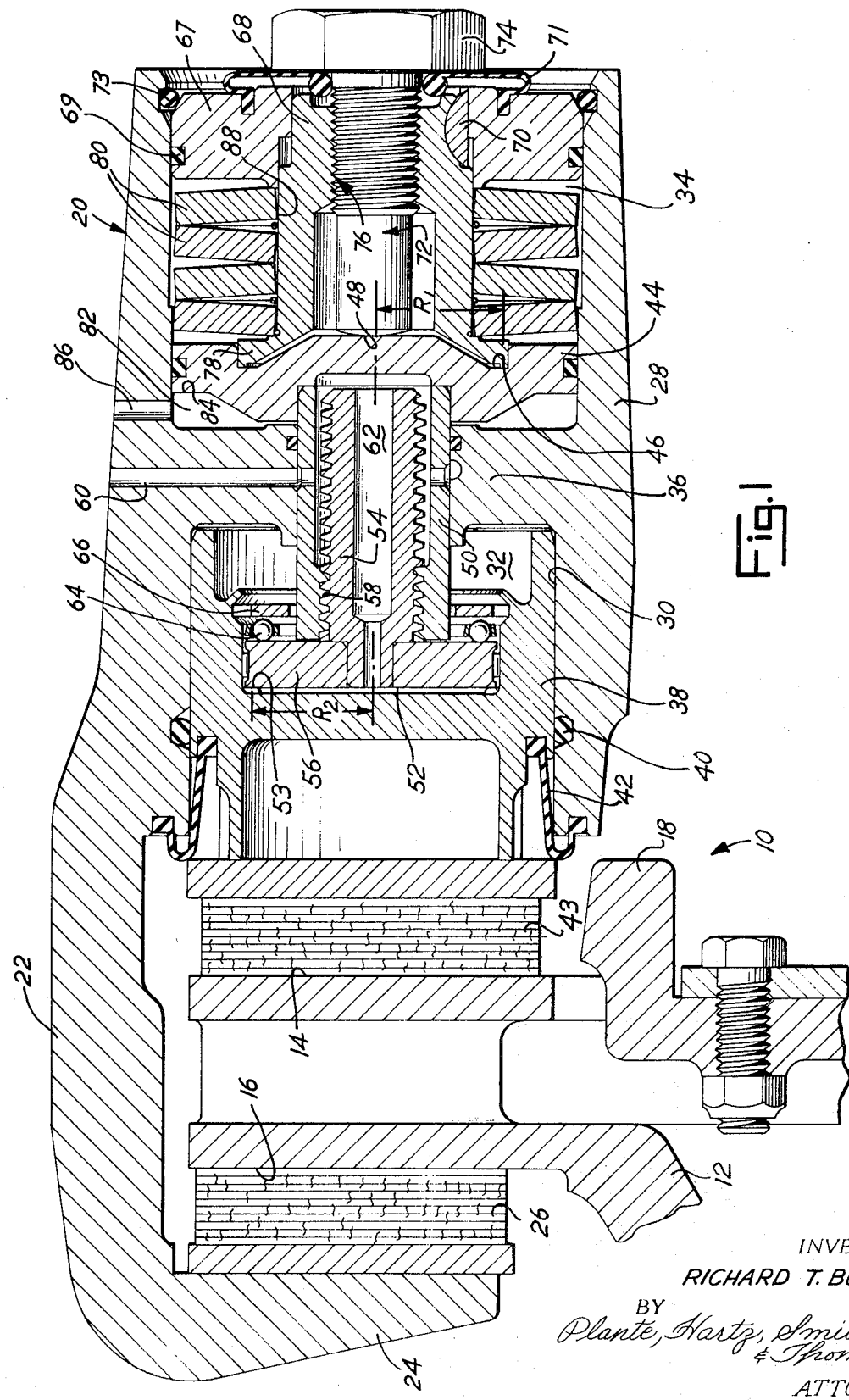
FIG. 1 is a longitudinal cross-sectional view of a disc brake made pursuant to the teachings of my present invention.

Referring now to FIG. 1 of the drawings, a disc brake generally indicated at 10 includes a rotor 12 having a pair of opposed friction faces 14 and 16 and is mounted for rotation with a member to be braked. A torque member 18 is secured to a non-rotatable part of the vehicle, such as the axle flange. A caliper housing 20 is slidably mounted on the torque member 18 by a pair of pins (not shown) as disclosed in my U.S. Pat. No. 3,388,774, owned by the assignee of the present invention and incorporated herein by reference.

Caliper 20 includes a bridge piece 22 that straddles the rotor 12, a radially inwardly extending portion 24 which carries a friction element 26 adjacent the friction face 16, and an actuator housing 28 defining a bore 30 therewithin. The bore 30 is divided into first and second coaxial chambers 32 and 34, respectively, by an annular partition 36. A piston 38 is slidable in the chamber 32 and is adapted to urge a friction element 40 which is slidably carried on the torque member 18 toward the friction face 14. The rear face of the piston 38 is communicated to a source of fluid pressure (not shown) which slides the piston 38 toward the rotor 12. An annular seal 40 prevents fluid from escaping from the bore 30 and also returns the piston 38 to the brake release position when the fluid pressure acting on the piston is reduced as is taught in my U.S. Pat. No. 3,377,076, owned by the assignee of the present invention and incorporated herein by reference. The usual flexible boot 42 interconnects the piston 38 and the housing 28 to exclude contaminants from the bore 30. The front face of the piston 38 engages a friction element 43 which is slidably carried on the torque member 18.

A second piston 44 is slidable on chamber 34 and is rotatable with respect thereto. One side of the piston 44 is provided with a circumferentially extending bearing surface 46 at a distance $R_1$ from the axis of rotation of the piston 44 and another bearing surface 48 coaxial with its axis of rotation. A sleeve 50 extends from the other side of the piston 44 and is slidably supported on the partition 36 so that the piston 44 and sleeve 50 can move toward and away from the rotor 12. An automatic adjuster assembly 52 includes an axially extending portion 54 which is received within the sleeve 50 and a radially extending portion 56 which contacts piston 38 on surface 53 at a distance $R_2$ from the axis of rotation of the piston 44 which is equal to the distance $R_1$. A low-friction bearing 64 is disposed between a washer 66 carried by the piston 38 and the radially extending portion 56 of the adjuster 52, so that movement of the piston 38 toward the rotor will exert an axially applied force on the adjuster 52. Mating screw threads 58 are provided on the inner surface of the sleeve 50 and on the outer surface of the portion 54. The helix angle of the screw threads 58 is chosen so that if an axially applied force is applied to the adjuster 52 by piston 38 through thrust bearing 64 acting toward the rotor 12 the adjuster 52 will turn relative to the sleeve 50, thereby extending from the latter. If an axially directed force acting toward the rotor 12 is applied to the adjuster by the sleeve 50, the threads 58 lock the sleeve and the adjuster against relative rotation because of friction between the surface 53 and the portion 54 of the assembly 52. If an axially directed force acting away from the rotor 12 acts on the adjuster 52 while the latter is locked against rotation while the sleeve 50 and wall 44 are free to rotate, the latter rotates relative to the portion 54, thereby retracting the portion 54 into the sleeve to move the adjuster 52 and the piston 38 away from the rotor. Tests have indicated that threads having a helix angle in the range of 18°-20° are satisfactory for this purpose. Fluid is admitted to the rear face of the piston 38 through passages 60 in the housing 12, between the outer surface of portion 54 and the inner surface of sleeve 50, and through channel 62 in the portion 54.

A fixed end cap 67 with seal 69 and boot 71 provides a closure for chamber 34. Annular structure 68 is slidably mounted in the chamber 34 near the outermost end thereof. A key 70 prevents relative rotation between the structure 68 and the end cap 67, but permits relative sliding movement therebetween. A bolt 72 extends through structure 68, and the head 74 of the bolt 72 projects from the end cap 67. Threads 76 interconnect the bolt 72 with the structure 68. The end of the bolt 72 engages the bearing surface 48. A radially projecting, circumferentially extending flange 78 extends from one end of the annular structure 68, and one side of the flange 68 is frictionally engaged with the bearing surface 46. A plurality of annular coned disc spring washers 80 engage the other side of the flange 78, and urge the structure 68 into engagement with the piston 44 and then urge the latter, the sleeve 50, the adjuster 52 and the piston 38 toward the rotor 12, thereby urging the friction elements 14, 16, into engagement with their corresponding friction faces. The coned disc spring washers 80 are of the type more fully disclosed in the aforementioned application Ser. No. 797,530 now U.S. Pat. No. 3,599,761 owned by the assignee of the present invention and incorporated herein by reference. The piston 44 is normally urged to the right viewing FIG. 1 against the bias of the washers 80 by fluid pressure in a variable volume chamber 82 defined by the other side 84 of the piston 44 and by the partition 36. Fluid is communicated to the chamber 82 through a passage 86. Annular structure 68 and the bolt 12 are disposed in the annular opening 88 defined by the washers 80.

MODE OF OPERATION

Passages 60 and 86 are connected to the appropriate parts of a vehicle hydraulic system, such as that disclosed in the aforementioned application Ser. No. 797,530. The hydraulic system maintains pressure in the chamber 82 at all times while the vehicle's engine is operating and the vehicle is in motion, thereby urging the piston 44 to the right viewing FIG. 1 against the bias of the coned disc spring washers 80. When the vehicle operator depresses the usual brake pedal (not shown) mounted in the operator's compartment, fluid is admitted through the passages 60 and 62 to the rear face of the piston 38 to urge the latter toward the rotor 12. Movement of the piston forces the friction element 43 into engagement with the friction face 14, and, since the caliper is slidable on the torque member 18, movement of the piston 38 also forces friction element 26 into engagement with the friction face 16.

If the piston 38 moves a distance greater than the spacing between the washer 66 and bearing 64 when the brake is applied, the washer will exert an axially directed force acting toward the rotor 12 on the portion 56 of the adjuster 52, causing the latter to rotate relative to the sleeve 50 due to the construction of the threads 58 as described above. Rotation of the portion 54 extends the latter from the sleeve 50, toward the rotor 12. Therefore, since the piston 38 can retract only until the rear face of the piston engages the adjuster 52, the clearance between the friction elements 26, 43 and their corresponding friction faces 16, 14 is maintained substantially constant despite wear of the friction material. The sleeve 50 and piston 44 are held against rotation relative to the housing to permit the adjuster 52 to operate. The washers 80 urge the flange 78 into frictional engagement with the bearing surface 46, thereby producing a torque due to friction between flange 78 and piston 44 retarding rotation of the latter.

When fluid pressure is evacuated from the chamber 82, for example, due to a malfunction in the vehicle hydraulic system, the washers 80 urge the piston 44, sleeve 50, adjuster 52 and piston 38 toward the rotor 12, thereby driving the friction elements against their corresponding friction faces. When this occurs, the vehicle's brakes are locked on and the vehicle is rendered immobile. Since a hydraulic failure may occur when the vehicle is disposed in an inconvenient position, for example, on a railroad track, it is desirable to provide a mechanism to release the brakes so that the vehicle might be towed away. In the brake shown in FIG. 1, the spring actuator may be released by using an appropriate tool to rotate the bolt 72 in a clockwise direction, thereby driving the end of the bolt 72 into engagement with the bearing surface 48 and urging the annular structure 68 to the right viewing FIG. 1 until the flange 78 is moved away from the bearing surface 46.

When the spring actuator is applied, an axially applied reaction force acts on the adjuster 52 due to its engagement with the rear face of the piston 38, tending to rotate the adjuster 52 or sleeve 50 due to the design of the threads 58. However, adjuster 52 is prevented from rotating due to the torque generated by the frictional forces acting between the piston 38 and portion 56 of the adjuster 52; similarly sleeve 50 is kept from rotating by the torque generated by the frictional engagement between the flange 78 and the bearing surface 46. However, when the flange 78 is moved out of engagement with the surface 46, the force generated by the washers 80 is transmitted through the bolt 72 to the bearing surface 48. Since the bearing surface 48 is at substantially the axis of rotation of the sleeve 50 and wall 42, no counteracting torque is applied to the latter tending to retard its rotation. The sleeve 50, therefore, rotates with respect to the housing 12, thereby retracting the portion 54 of adjuster 52 into the sleeve 50 to move the portion 56 of the adjuster away from the rear face of the piston 38, permitting the latter to retract to release the brake.

DETAILED DESCRIPTION OF THE ALTERNATE EMBODIMENT

In the embodiment of FIG. 2, elements substantially the same as those in the preferred embodiment retain the same reference numeral appended by the numeral 1. In FIG. 2, a closed end cylinder 189 is disposed within the opening 188 defined by the washers 180. A post 190 is slidably supported by the sleeve 150, and one end of the post 190 is slidably received within the open end of the cylinder 189. An adjuster nut 191 is threadedly engaged on the other end of the post 190, and is advanced toward the left viewing FIG. 2 by movement of the piston 138 toward the rotor 112 in excess of the spacing between the bearing 164 and the washer 166. The nut 191 therefore, limits retracting of the piston 138 to a substantially constant distance, despite wear of the friction elements. Fluid is admitted to the rear face of the piston 138 and into the cylinder 189, through the passages 160 and 192. A spring 193 yieldably urges the post 190 into the cylinder 189. When the force of fluid pressure in the cylinder 189 acting on the end of the post 190 received within the cylinder 189 exceeds the force of a spring 193 urging the post to the right viewing FIG. 2, the post 190 and the nut 191 move toward the rotor 112, thereby preventing operation of the adjuster during a high pressure brake application. Overadjustment of the brake due to elastic deformation of the friction elements during a "panic stop" is thereby prevented. The post 190 also includes a radially projecting shoulder 194 which is engaged by the end of the sleeve 150 when fluid pressure in the chamber 182 is evacuated and the Belleville washers 180 urge the sleeve 150, the post 190, the nut 191 and the piston 138 toward the rotor 112, thereby urging the friction elements 126 and 143 into engagement with their corresponding friction faces. Details of the construction and operation of the compensating adjuster illustrated in FIG. 2 are more completely described in my copending U.S. Pat. application Ser. No. 669 filed Jan. 5, 1970, assigned to the assignee of the present invention and incorporated herein by reference.

As discussed herein, it is desirable to be able to manually release the spring actuator after the latter has applied the brake. For this reason, a bolt 172 is threadedly engaged with the cylinder 189 and extends through a bore 195 in the end of the caliper housing 120. A radially projecting lip 196 extends from the cylinder 189, and is engaged by one of the washers 180. When the washers 180 urge the piston 144 to the left viewing FIG. 1 when the brake is applied, they will also urge the cylinder 189 in the same direction. As the cylinder is moved, the bolt 172 slides relative to the bore 195 until a shoulder 197 defined between the head 174 and bolt 172 engages the portion of the housing 120 adjacent the bore 195. When the brake is to be released, an appropriate tool is used to rotate the bolt 172 in a clockwise direction, thereby urging the cylinder 189 to the right viewing FIG. 2, due to the threaded connection between the bolt and the cylinder. As the cylinder 189 is moved to the right, the washers 180 will also be moved to the right due to the engagement between the washers 180 and the lip 196. As the washers 180 are moved to the right, the force that they exert on the piston 144 will also be decreased, thereby also decreasing the pressure applied to the piston 138, to release the brake.

I claim:

1. In a disc brake:
    a torque member;
    a rotor having a pair of friction faces;
    a pair of friction elements, one of said elements being disposed adjacent each of said friction faces;
    a caliper slidably mounted on said torque member bridging said rotor and including a housing defining a bore therewithin;
    a piston slidable in said bore operably connected to each of said friction elements for forcing the latter against their corresponding friction faces when the brake is actuated;
    an annular member carried by the housing aligned with the piston;
    an adjuster member for engagement with the piston to limit retraction of the latter to a substantially constant distance despite wear of the friction elements;
    said adjuster member including an axially extending portion extending into said annular member, there being complementary screw threads on said portion and on the inner surface of the annular member, the threads on said portion engaging the threads on the annular member, said threads permitting an axially applied force on said adjuster member to rotate the latter thereby extending the adjuster member from the annular member; the adjuster member for rotating the latter upon movement of the piston toward the rotor in excess of a predetermined distance;

means for urging said adjuster member into engagement with said piston and thereafter urging said members and said piston toward said rotor to drive said friction elements into engagement with their corresponding friction faces whereby said piston applies an axially directed force on said adjuster member acting away from said rotor, said force frictionally restraining the adjuster member from rotation relative to the housing; and means movable from a first position preventing relative rotation between the annular member and the housing to a second position permitting said rotation;

said annular member rotating relative to said adjuster member upon movement of said last-mentioned means to said second position to permit said portion to retract into said annular member to move the adjuster member away from the rotor to thereby relieve said axially directed force.

2. The invention of claim 1: said movable means including a member held against rotation relative to the housing, said movable means in said first position frictionally engaging said annular member a substantial distance from the axis of rotation of the latter to exert a torque thereon preventing rotation of the latter.

3. In a disc brake having a rotor and a pair of friction elements disposed on opposite sides of the rotor, an actuator comprising:

a housing defining a bore therewithin;

a piston slidable in said bore and operatively connected to said friction elements for forcing the latter against said rotor;

first and second relatively rotatable elongated members within said bore for limiting retraction of said piston to a predetermined amount, said members being interconnected to permit one of the members to extend from and retract into the other member upon relative rotation between the members, said piston being adapted to rotate one of said members to thereby extend said one member from the other member upon relative movement between the piston and the members in excess of a predetermined distance;

actuating means in said housing for urging said members and said piston as a unit toward said rotor to urge said friction elements into engagement with said rotor; and manually manipulable means extending from said housing and restrained from rotation relative to the latter, said manually manipulable means being shiftable from a first condition frictionally engaging the other member to prevent rotation of the latter to a second position permitting rotation of the other member to retract the one member into the other member.

4. The invention of claim 3:

said manually manipulable means including inner and outer threadedly interconnected elements, said outer member being urged into frictional engagement with said other member at a substantial distance from the centerline of the outer member when the manually manipulable means is disposed in the first position, said inner element being brought into engagement with said other member at a point substantially coaxial with the centerline of the latter and urging said outer element away from said other member to thereby relieve the frictional torque applied to the latter.

5. The invention of claim 3:

said first named means including spring means disposed between said housing and the other member yieldably urging the latter toward the rotor.

6. The invention of claim 5:

said spring means having an annular opening therein coaxial with said members;

said manually manipulable means including structure mounted in said opening for movement from a first position frictionally engaging said other member at a substantial distance from the axis of rotation of the latter to thereby exert a frictional torque thereon opposing rotation of the other member to a second position in which the structure is spaced from the other member to permit the other member to rotate relative to the one member thereby retracting the latter.

7. The invention of claim 3:

said manually manipulable means including structure mounted in said housing for movement from a first position frictionally engaging said other member at a substantial distance from the axis of rotation of the latter to thereby exert a frictional torque thereon opposing rotation of the other member to a second position in which the structure is spaced from the other member to permit the latter to rotate relative to the one member thereby retracting the latter.

8. The invention of claim 7: and bolt means threadedly engaging said structure;

one end of said bolt means engaging said other member substantially at the axis of rotation of the latter;

said bolt urging said structure out of frictional engagement with the other member thereby relieving said torque to permit the other member to rotate.

9. The invention of claim 8:

one end of said bolt engaging the end of the other member at a point along the axis of rotation of the latter, whereby the other member is urged away from the structure to relieve the frictional force between the structure and the other member when the bolt is rotated.

* * * * *